United States Patent [19]
Gatlin

[11] Patent Number: 5,128,049
[45] Date of Patent: Jul. 7, 1992

[54] HYDROGEN SULFIDE REMOVAL PROCESS

[76] Inventor: Larry W. Gatlin, Rte. 2, Box 181A, Hwy. 1301, Floresville, Tex. 78114

[21] Appl. No.: 643,795

[22] Filed: Jan. 22, 1991

[51] Int. Cl.$^5$ ............................ C02F 1/58; C01B 17/16
[52] U.S. Cl. ...................................... 210/752; 210/917; 423/226; 423/228; 55/73
[58] Field of Search .................. 423/226–229; 210/729, 749, 750, 757, 917; 55/73

[56] References Cited

U.S. PATENT DOCUMENTS

| | | | |
|---|---|---|---|
| 4,252,655 | 2/1981 | Carney | 210/749 |
| 4,283,379 | 8/1981 | Fenton et al. | 423/226 |
| 4,400,361 | 8/1983 | Shafer | 423/226 |
| 4,556,546 | 12/1985 | Burgoyne, Jr. et al. | 423/226 |
| 4,741,888 | 5/1988 | Fong et al. | 55/73 |
| 4,748,011 | 5/1988 | Baize | 423/228 |
| 4,978,512 | 12/1990 | Dillon | 423/226 |

Primary Examiner—Thomas Wyse
Attorney, Agent, or Firm—Ross, Howison, Clapp & Korn

[57] ABSTRACT

A method for reducing the hydrogen sulfide content of hydrocarbon-containing fluids and aqueous solutions through a two-stage injection procedure whereby a dilute solution of a scavenging agent is injected into a hydrogen sulfide-containing fluid, followed by equilibration and a second injection of dilute solution of scavenging agent to further reduce the hydrogen sulfide content of the treated fluid.

4 Claims, No Drawings

HYDROGEN SULFIDE REMOVAL PROCESS

TECHNICAL FIELD

This invention relates to a method for scavenging hydrogen sulfide from fluids such as gases, hydrocarbon liquids, and various water solutions.

BACKGROUND OF THE INVENTION

The need for effective methods and compositions for scavenging hydrogen sulfide from fluids, especially hydrocarbon-containing liquids and gases produced from wells, has long been recognized. Unless removed or reacted to form other compounds, hydrogen sulfide concentrations in such fluids are undesirable and hazardous because of the associated corrosivity and toxicity.

The use of organic zinc chelates and for the removal or inactivation of hydrogen sulfide in fluids for drilling, completing or servicing wells is disclosed, for example, in U.S. Pat. No. 4,252,655.

In U.S. Pat. No. 4,569,766, a method is disclosed for scavenging hydrogen sulfide and mercaptans from fluids by contacting the fluids with maleimides.

In U.S. Pat. No. 4,680,127, a method is disclosed for reducing the amount of hydrogen sulfide in aqueous or wet gaseous mediums by adding an effective amount of glyoxal, preferably in combination with formaldehyde or glutaraldehyde.

In U.S. Pat. No. 4,748,011, a method is disclosed for the separation and collection of natural gas comprising the use of a sweetening solution. The sweetening solution consists of an aldehyde or a ketone, methanol, an amine inhibitor, sodium or potassium hydroxides and isopropanol. The amine inhibitor includes alkanolamines to adjust the pH.

In U.S. Pat. No. 4,978,512, a method is disclosed for selectively reducing the levels of hydrogen sulfide and organic sulfides present in gaseous or liquid hydrocarbon streams or mixtures thereof by contacting the streams with the reaction product of a lower alkanolamine and a lower aldehyde.

Other commercially available compounds generally classified as anti-microbial agents, bactericides, fungicides and preservatives have previously been recognized for their usefulness in reducing microbial, bacterial or slime contamination of aqueous fluids. In some instances, such fluids have also been disclosed for use in controlling the growth of sulfate-reducing bacteria in oil field flooding applications to minimize plugging and corrosion. Such agents are typically injected into fluid streams at a single point in concentrated form. Single point injection causes a high concentration of hydrogen sulfide scavenger in the bulk fluid at the point of injection, but does not facilitate uniform or maximum distribution of the chemical agent throughout the hydrogen sulfide-containing fluid.

SUMMARY OF THE INVENTION

According to the present invention, an improved method is provided for scavenging hydrogen sulfide from fluid streams. According to one embodiment of the invention, the treating fluid is injected into the hydrogen sulfide-containing fluid stream in dilute form at more than one injection point to achieve significantly improved dispersion and decontamination.

The method of the invention is preferably a two-stage method involving first a pretreatment step to remove the bulk of the hydrogen sulfide from the fluid stream, followed by a polishing step adapted to further maximize hydrogen sulfide conversion in the treated fluid.

Pretreatment and polishing in accordance with the method of the invention reduces the amount of chemical agent required to perform the desired hydrogen sulfide scavenging function, and allows time for the chemical agent to equilibrate, thereby normally reducing the need for additional catalytic agents.

DESCRIPTION OF THE PREFERRED EMBODIMENTS

According to the method of the invention, a hydrogen sulfide-scavenging agent is introduced into a fluid stream that can include, for example, liquid or gaseous hydrocarbon-containing fluids or other aqueous fluids containing hydrogen sulfide. When added to such fluids in dilute form according to the method of the invention, the scavenging agents disclosed herein react directly with hydrogen sulfide and convert it to thio alcohols, mercaptans, thio complexes, poly-sulfides, sulphur, or inorganic sulfate salts.

Scavenging agents useful in practicing the method of the invention are preferably selected from the group consisting of: hexahydro-1,3,5-tris (2-hydroxyethyl)-S-triazine; tris (hydroxymethyl) nitromethane; a mixture of 4-(2-nitrobutyl)morpholine and 4,4'-(2-ethyl-2-nitrotrimethylene)-dimorpholine; a mixture of 4,4-dimethyloxazolidine and 3,4,4-trimethyloxazolidine; hexahydro-1,3,5-triethyl-S-triazine; a mixture of sodium 2-pyridinethiol-1-oxide and hexahydro-1,3,5-tris(2-hydroxyethyl)-S-triazine; 2,2-dibromo-3-nitrilopropionamide; methanol [[[2-(dihydro-5-methyl-3(2H)-oxazolyl)-1-methylethyoxy]methoxy]methoxy]; 2[(hydroxymethyl)amino]ethanol; 2[(hydroxymethyl)amino]-2-methyl-propanol; sodium dichloro-S-triazinetrione dihydrate; or a solution of 1,3-bis(hydroxymethyl)-5,5-dimethylhydantoin and 1-(hydroxymethyl)-5,5-dimethylhydantoin.

Hexahydro-1,3,5-tris (2-hydroxyethyl)-S-triazine is commercially available in aqueous solution from United Industrial Chemicals, Inc. under the tradename UNICIDE TZ-135 and from Angus Chemical Company under the tradename BIOBAN GK. UNICIDE TZ-135 is marketed as a fungicide and bactericide for use, by way of example, in controlling the growth of bacteria and fungi in oil well drilling and processing fluids. BIOBAN GK is also marketed as a bactericide.

Tris (hydroxymethyl) nitromethane is commercially available in aqueous solution from Angus Chemical Company under the tradename TRIS NITRO, and is marketed as an antimicrobial agent.

A mixture of 4-(2-nitrobutyl)morpholine and 4,4'-(2-ethyl-2-nitrotrimethylene)-dimorpholine is commercially available from Angus Chemical Company under the tradenames BIOBAN P-1487 or BIOBAN FP, and is marketed as an antimicrobial agent.

A mixture of 4,4-dimethyloxazolidine and 3,4,4-trimethyloxazolidine is commercially available from Angus Chemical Company under the tradename BIOBAN CS-1135, and is marketed as antimicrobial agent for use in oilfield water systems, and as a corrosion inhibitor. This material is also available from Cosan Chemical Corporation under the tradename COSAN 101.

Hexahydro-1,3,5-triethyl-S-triazine is commercially available from R. T. Vanderbilt Co., Inc. under the tradename VANICIDE TH, and is marketed as an industrial preservative.

A mixture of sodium 2-pyridinethiol-1-oxide and hexahydro-1,3,5-tris(2-hydroxyethyl)-S-triazine is commercially available from Olin Chemicals under the tradename TRIADINE 10, and is marketed as an antimicrobial agent.

Two,2-dibromo-3-nitrilopropionamide is commercially available from Dow Chemical U.S.A. under the tradename DBNPA, and is marketed as a broad spectrum, low persistency biocide.

Methanol [[[2-(dihydro-5-methyl-3(2H)-oxazolyl)-1-methylethyoxy]methoxy]methoxy] is commercially a in aqueous solution from Cosan Chemical Corporation under the tradename Cosan 145, and is marketed as an antimicrobial preservative.

Two[(hydroxymethyl)amino]ethanol is commercially available from Troy Chemical Corp. under the tradename TROYSAN 174, and is marketed as a water-soluble biocide. This material is also available from Cosan Chemical Corporation under the tradename COSAN 91.

Two[(hydroxymethyl)amino]-2-methyl-propanol is commercially available from Troy Chemical Company under the tradename TROYSAN 192, and is marketed as a water-soluble biocide.

Sodium dichloro-S-triazinetrione dihydrate is commercially available from Olin Chemicals under the tradename OCI 56, and is market for use as a bleach, sanitizer or cleaning compound.

A solution of 1,3-bis(hydroxymethyl)-5,5-dimethylhydantoin and 1-(hydroxymethyl)-5,5-dimethylhydantoin is commercially available from Calgon Corp. under the tradename BIOCHEK 240, and is marketed as an antibacterial preservative.

In accordance with the method of the invention, the scavenging agent selected for use in a particular application is preferably diluted in one or more of the following: water, alcohol such as methanol, ethanol or isopropanol; glycols such as ethylene glycol or trimethylene glycol; or glycerin. According to a preferred embodiment of the invention, the scavenging agents will contain from about 1 to about 50 percent, and typically from about 10 to about 30 percent, of one or more of the preferred active ingredients identified above. These dilute solutions of scavenging agents are preferably added to the hydrogen sulfide-containing streams at concentrations of about 0.05 to about 100 ppm of diluted scavenging agent per 1 ppm of hydrogen sulfide, and most preferably, at concentrations of from about 2 to about 10 ppm of diluted scavenging agent per 1 ppm of hydrogen sulfide.

When diluted in accordance with the method disclosed herein, another advantage is obtained in that the dilute solutions are easier to vaporize in gaseous streams than when used as anti-microbial agents, bactericides, fungicides or preservatives in their more concentrated forms. Dilution of the scavenging agent also reduces the adsorption onto metal surfaces of flow lines or vessels, thereby maximizing the amount of the active ingredient available for reaction and removal of hydrogen sulfide.

In the first, or "pretreatment" stage of the invention, a scavenging agent in a solution concentration comprising from about 1 to about 50 percent, and preferably from about 10 to about 30 percent, of active ingredient is preferably injected into a flow line (for example, at the wellhead) through which the hydrogen sulfide-containing fluid to be treated is flowing. During this "pretreatment step", a majority of the hydrogen sulfide is desirably converted by the scavenging agent into a relative less corrosive and less toxic compound such as, for example, thio alcohols, mercaptans, thio complexes, polysulfides, sulphur, or an inorganic sulfate salt. Preferably, during the pretreatment step the hydrogen sulfide content of the treated material will be lowered to a level ranging from about 20 to about 100 ppm, and most preferably, to a level ranging from about 3 to about 10 ppm.

In some systems, where fluid velocities are high, the use of an additional catalytic agent may be desirable. Such catalysts can include, for example, ferrous or ferric iron, nickel, cobalt, copper, barium or strontium in the form of salts or chelates.

After allowing time for the scavenging agent to equilibrate in the treated fluid, the second stage or "polishing" step of the process is preferably implemented. The time allowed before the polishing step can range, for example, from as little as 15 minutes to 24 hours or longer, depending upon the particular application and use environment. The second stage injection preferably takes place at or near a vessel or separator tower in which the previously pretreated hydrogen sulfide-containing fluid is stored or further processed.

During the polishing step of the process, the hydrogen sulfide content of the treated material is preferably reduced to a level ranging from about 0.05 to about 40 ppm, and most preferably to a level less than about 4 ppm. (In most instances, the hydrogen sulfide content of natural gas must be reduced to a level of 4 ppm or below prior to sale and introduction into commercial pipelines.) Hydrogen sulfide levels between about 0.05 and 1 ppm in the final product may be hard to achieve in some situations without adding excess active ingredient, or without waiting undesirably long periods of time.

EXAMPLE

A well in West Texas was producing about 1.5 of sour gas per day. The well was producing 25 barrels of low salinity brine per day. The gas analysis showed a hydrogen sulfide content of 600 ppm. Using a process as disclosed in U.S. Pat. No. 4,748,011, a formaldehyde solution was being injected prior to a gas-liquid separator at a rate of 9 gallons per day, or about 3.5 ppm of active ingredient per ppm of hydrogen sulfide. The hydrogen sulfide content was being reduced to about 100 ppm (varying from about 80 to about 160 ppm). The injection point was later moved to the wellhead, about 900 feet away. The hydrogen sulfide content of the produced gas downstream of the separator was about 40 ppm after 24 hours.

To illustrate the improved efficiency of the method disclosed herein, hexahydro-1,3,5-tris (2-hydroxyethyl) -S-triazine was diluted with 4 parts water to about a 15 percent concentration of the active ingredient. During the "pretreatment" or first stage, the dilute scavenging agent was injected at the wellhead at a rate of about 7.75 gallons per day, or about 3 ppm of active ingredient per ppm of hydrogen sulfide, and reduced the hydrogen sulfide level from about 600 ppm down to about 20 to 30 ppm. In the "polishing" or second stage, the same dilute scavenging agent was introduced ahead of the two phase separator at a rate of about 0.85 gallons per day. Within 4 hours, the hydrogen sulfide content of the treated fluid was reduced to 5 ppm. Injection was continued for 7 days. After treatment of the system for 7 days, the gas was checked again for formaldehyde content, and the formaldehyde content was determined to be 0. The hydrogen sulfide content of the treated gas ranged from about 4 down to about 1 ppm.

In addition to reducing the hydrogen sulfide content of the treated fluid below levels otherwise obtainable through use of conventional methods and scavenging agents, the fluids treated according to the method disclosed herein do not introduce other potentially toxic materials such as formaldehyde into fluids such as natural gas, which may subsequently be sold to public utilities.

Other alterations and modifications of the invention disclosed herein will become apparent to those of ordinary skill in the art upon reading this disclosure, and it is intended that the scope of the invention be limited only by the broadest interpretation of the appended claims to which the inventor is legally entitled.

I claim:

1. A method for reducing the hydrogen sulfide content of fluids comprising hydrocarbon-containing liquids, hydrocarbon-containing gases, aqueous liquids, aqueous wet gases, and mixtures thereof, said method comprising the steps of:

(a) forming a dilute solution of scavenging agent selected from the group consisting of hexahydro-1,3,5-tris (2-hydroxyethyl)-s-Triazine; tris (hydroxylmethyl) nitromethane; a mixture of 4-(2-nitrobutyl)morpholine and 4,4'-(2-ethyl-2-nitrotrimethylene)-dimorpholine; a mixture of 4,4-dimethyloxazolidine and 3,4,4-trimethyloxazolidine; hexahydro-1,3,5-triethyl-s-triazine; a mixture of sodium 2-pyridinethiol-1-oxide and hexahydro-1,3,5-tris(2-hydroxyethyl)-s-triazine; 2,2-dibromo-3-nitrilopropionamide; methanol [[[2-(dihydro-5-methyl-3(2H)-oxazolyl)-1-methylethyoxy]methoxy]methoxy]; 2[(hydroxymethyl)amino]ethanol; 2[(hydroxymethyl)amino]-2-methyl-propanol; sodium dichloro-s-triazinetrione dihydrate; or 1-(hydroxymethyl)-5,5 dimethylhydantoin, said dilute solution comprising from about 10 to about 30 weight percent of said scavenging agent, the amount of said dilute solution being sufficient to provide from about 2 to about 10 ppm of diluted scavenging agent per ppm of hydrogen sulfide in said hydrogen-sulfide containing fluid;

(b) introducing about 90 percent of said dilute solution into said hydrogen sulfide-containing fluid;

(c) waiting at least about 15 minutes to permit said dilute solution containing said scavenging agent to disperse and equilibrate within said hydrogen sulfide-containing fluid, thereby permitting said scavenging agent to react with a major portion of the hydrogen sulfide within said fluid;

(d) introducing about 10 percent of the dilute solution of said scavenging agent into said hydrogen sulfide-containing fluid; and (e) permitting said scavenging agent in said dilute solution to disperse and equilibrate following said further introduction, thereby further reducing the amount of hydrogen sulfide in said fluid.

2. The method of claim 1 wherein said scavenging agent is diluted in a liquid selected from the group consisting of water, alcohol, glycol, and mixtures thereof.

3. The method of claim 1 wherein said dilute solution further comprises a minor effective amount of a catalytic agent adapted to promote the conversion of hydrogen sulfide in said fluid by said scavenging agent.

4. The method of claim 3 wherein said catalytic agent is selected from the group consisting of salts and chelates of iron, nickel, cobalt, copper, barium and strontium.

* * * * *

UNITED STATES PATENT AND TRADEMARK OFFICE
CERTIFICATE OF CORRECTION

PATENT NO. : 5,128,049

DATED : JULY 7, 1992

INVENTOR(S) : LARRY W. GATLIN

It is certified that error appears in the above-identified patent and that said Letters Patent is hereby corrected as shown below:

COLUMN 3, LINE 13:

After commercially delete [a] and insert --available--.

COLUMN 5, LINE 27:

Spelling of "ylmethyl" should be changed to "ymethyl".

Signed and Sealed this

Fourteenth Day of September, 1993

Attest:

BRUCE LEHMAN

*Attesting Officer*     *Commissioner of Patents and Trademarks*